United States Patent
Bogdanović et al.

(10) Patent No.: US 6,814,782 B2
(45) Date of Patent: Nov. 9, 2004

(54) METHOD FOR REVERSIBLY STORING HYDROGEN ON THE BASIS OF ALKALI METALS AND ALUMINUM

(75) Inventors: Borislav Bogdanović, Mülheim an der Ruhr (DE); Manfred Schwickardi, Mülheim an der Ruhr (DE)

(73) Assignee: Studiengesellschaft Kohle mbH, Mulheim am der Ruhr (DE)

( * ) Notice: Subject to any disclaimer, the term of this patent is extended or adjusted under 35 U.S.C. 154(b) by 0 days.

(21) Appl. No.: 10/221,466

(22) PCT Filed: Mar. 2, 2001

(86) PCT No.: PCT/EP01/02363

§ 371 (c)(1),
(2), (4) Date: Sep. 12, 2002

(87) PCT Pub. No.: WO01/68515

PCT Pub. Date: Sep. 20, 2001

(65) Prior Publication Data

US 2003/0053948 A1 Mar. 20, 2003

(30) Foreign Application Priority Data

Mar. 16, 2000  (DE) .......................................... 100 12 794

(51) Int. Cl.[7] ............................. B01D 53/04; C01B 3/04
(52) U.S. Cl. .................... 95/116; 252/182.35; 423/644; 423/648.1
(58) Field of Search .............. 95/116, 127; 252/182.35; 420/900; 423/644, 648.1, 658.2

(56) References Cited

U.S. PATENT DOCUMENTS

| | | | |
|---|---|---|---|
| 3,210,150 A | * 10/1965 | Powers, Jr. ................. | 423/644 |
| 3,222,122 A | * 12/1965 | Johnson et al. ............. | 423/644 |
| 3,290,123 A | * 12/1966 | Del Giudice et al. ........ | 423/644 |
| 3,298,800 A | * 1/1967 | Wade .......................... | 423/644 |
| 3,734,863 A | * 5/1973 | Beckert et al. ................ | 149/7 |
| 3,755,555 A | * 8/1973 | Dymova et al. ............. | 423/644 |
| 3,931,395 A | * 1/1976 | Beckert et al. ........... | 423/648.1 |
| 3,959,454 A | * 5/1976 | Rogler et al. ............... | 423/644 |
| 4,790,985 A | * 12/1988 | Nelson ........................ | 423/644 |
| 4,832,934 A | * 5/1989 | Bogdanovic et al. ........ | 423/463 |
| 6,106,801 A | * 8/2000 | Bogdanovic et al. .... | 423/648.1 |
| 6,251,349 B1 | * 6/2001 | Zaluska et al. ............. | 423/286 |
| 6,342,198 B1 | * 1/2002 | Zaluska et al. .......... | 423/658.2 |
| 6,471,935 B2 | * 10/2002 | Jensen et al. ............... | 423/646 |

FOREIGN PATENT DOCUMENTS

| WO | WO 97/03919 | * 2/1997 |
|---|---|---|
| WO | WO 00/07930 | * 2/2000 |

OTHER PUBLICATIONS

L. Zaluski et al., "Hydrogenation properties of complex alkali metal hydrides fabricated by mechano–chemical synthesis", J. of Alloys and Compounds 290 (1999) 71–78.*

A. Zaluska et al., "Sodium alanates for reversible hydrogen storage", J. of Alloys and Compounds 298 (2000) 125–134.*

E. C. Ashby et al., "Direct Synthesis of Complex Metal Hydrides", Inorganic Chemistry vol. 2, No. 3, Jun. 1963 499–504.*

* cited by examiner

*Primary Examiner*—Robert H. Spitzer
(74) *Attorney, Agent, or Firm*—Norris McLaughlin & Marcus PA

(57) ABSTRACT

A method for reversibly storing hydrogen, characterized in that reversible hydrogen storage materials are used which contain mixtures of aluminum metal with alkali metals and/or alkali metal hydrides and transition metal and/or rare-earth metal catalysts.

22 Claims, 3 Drawing Sheets

Figure 1:
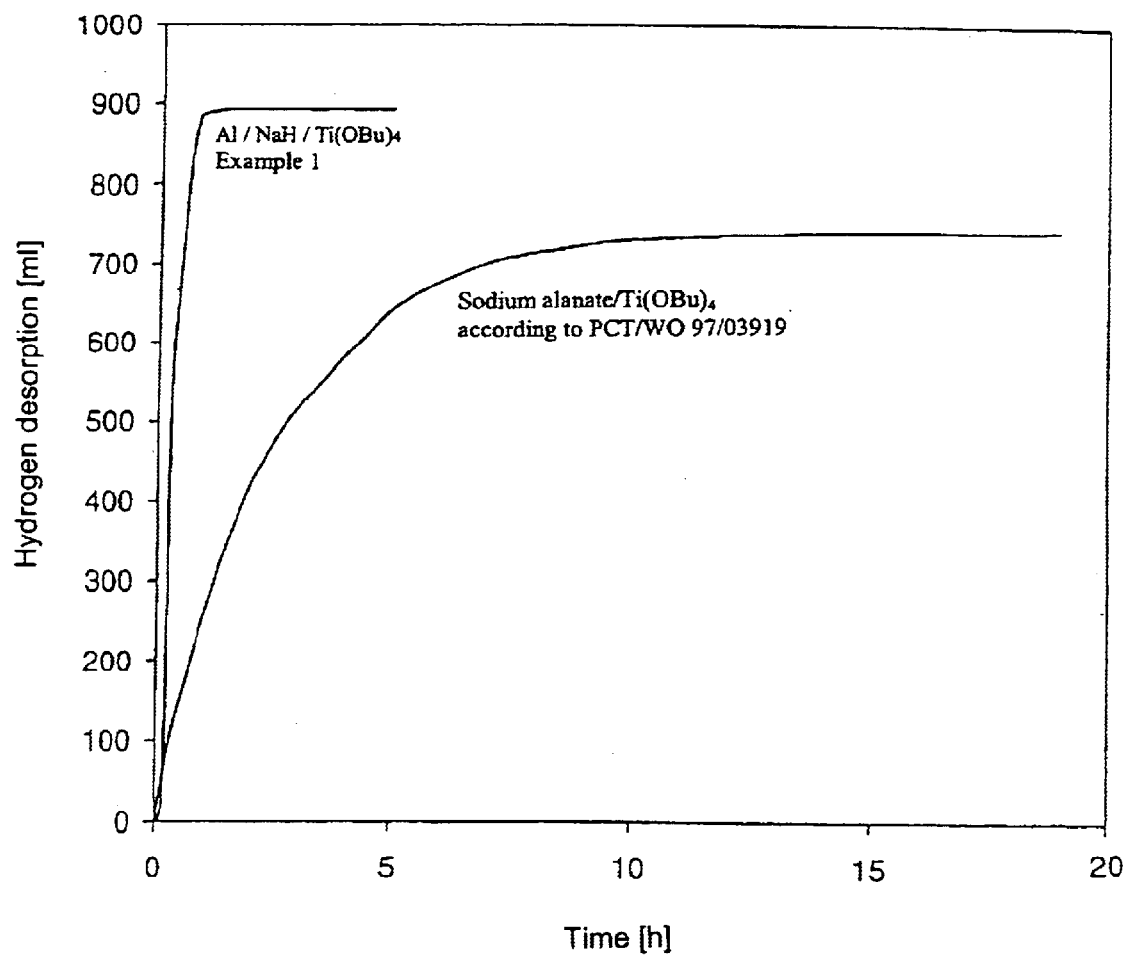

METHOD FOR REVERSIBLY STORING HYDROGEN ON THE BASIS OF ALKALI METALS AND ALUMINUM

This application is a 371 of PCT/EP01/02363, filed on Mar. 2, 2001.

The present invention relates to a method for reversibly storing hydrogen using alkali metals or their hydrides and aluminum metal as hydrogen storage materials and doping with transition metal catalysts.

According to the patent application PCT/WO 97/03919 of the Studiengesellschaft Kohle mbH (SGK), a method for reversibly storing hydrogen is known using the alkali metal alanates of general formula $M^1_{p(1-x)}M^2_{px}AlH_{3+p}$ (1) as storage materials, where $M^1$=Na, K; $M^2$=Li, K; $0 \leq x \leq \sim 0.8$; $1 \leq p \leq 3$. To improve the hydrogenation/dehydrogenation kinetics, the alkali metal alanates are doped with transition metal compounds in catalytic amounts. In particular, the alanates $NaAlH_4$, $Na_3AlH_6$ and $Na_2LiAlH_6$ are employed.

The drawbacks of the previous SGK method are that the preparation and purification of commercial sodium alanate, the preparation of $Na_3AlH_6$ or $Na_2LiAlH_6$ and the subsequent doping in organic solvents are relatively complicated on a preparative level and in most cases require the use of solvents which are highly volatile and highly inflammable (ether, pentane) or tend to form peroxides (ether, THF).

Surprisingly, it has now been found that instead of using the transition-metal doped alkali metal alanates as hydrogen storage materials, the starting materials used for their preparation in the form of alkali metal hydrides or alkali metals (especially NaH and Na), Al powder and doping agents can be employed. The alanates formed in one hydrogenation step from such starting materials are immediately functioning as $H_2$ storage materials and have improved storage properties as compared to PCT/WO 97/03919.

Methods for the preparation of alkali metal alanates from alkali metal hydrides (or alkali metals), aluminum and hydrogen are known. A survey of the methods for the preparation of $NaAlH_4$, $Na_3AlH_6$ and $Na_2LiAlH_6$ can be found in J. Alloys & Compounds, 298 (2000) 125–134. Thus, according to the German Patent Specification 1 136 987 (1962), Na and Li alanates can be prepared by reacting the corresponding alkali metal hydrides (or alkali metals) and aluminum in ethers, amines and aliphatic or aromatic hydrocarbons, optionally in the presence of catalytic amounts of organoaluminum compounds, with hydrogen under pressure. The U.S. Pat. No. 3,138,433 (1964) describes, inter alia, a method for the preparation of $NaAlH_4$ from NaH, Al and hydrogen under pressure in THF using Ti, Zr, Hf and Th tetrahalides as catalysts; however, in the only patent example contained therein, a maximum of 21.8% is stated as the yield of $NaAlH_4$. The direct synthesis of $Na_3AlH_6$ can be successfully performed with 98% yield according to Inorg. Chem. 5 (1966) 1615 by reacting Na and activated Al powder in diglyme in the presence of $Et_3Al$ with hydrogen under pressure (350 bar). The synthesis of NaAlH4 from the elements Na, Al and $H_2$ is also possible in the absence of organic solvents according to Dokl. Akad. Nauk SSSR 215 (1974) 1369, Engl. 256, by performing the process in the molten state ($\geq$175 bar, <280° C.). The alkali metal alanates prepared according to the methods mentioned were not considered for purposes of hydrogen storage.

In contrast, the preparation of the storage material according to the present invention is very simple, completely dispensing with organic solvents. The aluminum powder used according to the present method is cheaper and more easily handled than sodium alanate, which was previously employed. It was particularly surprising that the hydrogenation of aluminum in the presence of alkali metals or metal hydrides can be successfully performed at temperatures which are considerably below the melting points of the metal/metal hydride educts involved and the metal alanate products, i.e., in a solid state (in contrast to the above referenced direct synthesis according to Dymova et al., Dokl. Akad. Nauk SSSR 215 (1974) 1369, Engl. 256 "Direct Synthesis of Alkali Metal Aluminium Hydrides in the Melt").

According to the present invention, for example, aluminum powder is mixed with powdered sodium hydride and admixed with catalytic amounts of titanium tetrabutylate. The composition thus obtained can be used directly as a reversible hydrogen storage material, When Al and NaH are employed at a molar ratio 1:1, $NaAlH_4$ is obtained in the hydrogenation, whereas a molar ratio of 1:3 yields $Na_3AlH_6$ after hydrogenation.

Another particular advantage of the present method for reversibly storing hydrogen is that the desorption and absorption kinetics could be significantly improved by facilitating the previously known method according to PCT/WO 97/03919.

In FIG. 1, the hydrogen desorption at 160° C. under normal pressure according to the present invention is shown as compared to the previously known method of the Studiengesellschaft Kohle. According to the previous method, a complete discharge of the storage material takes about 10 h, while desorption according to the present invention only takes about 1 h.

Figure 2:
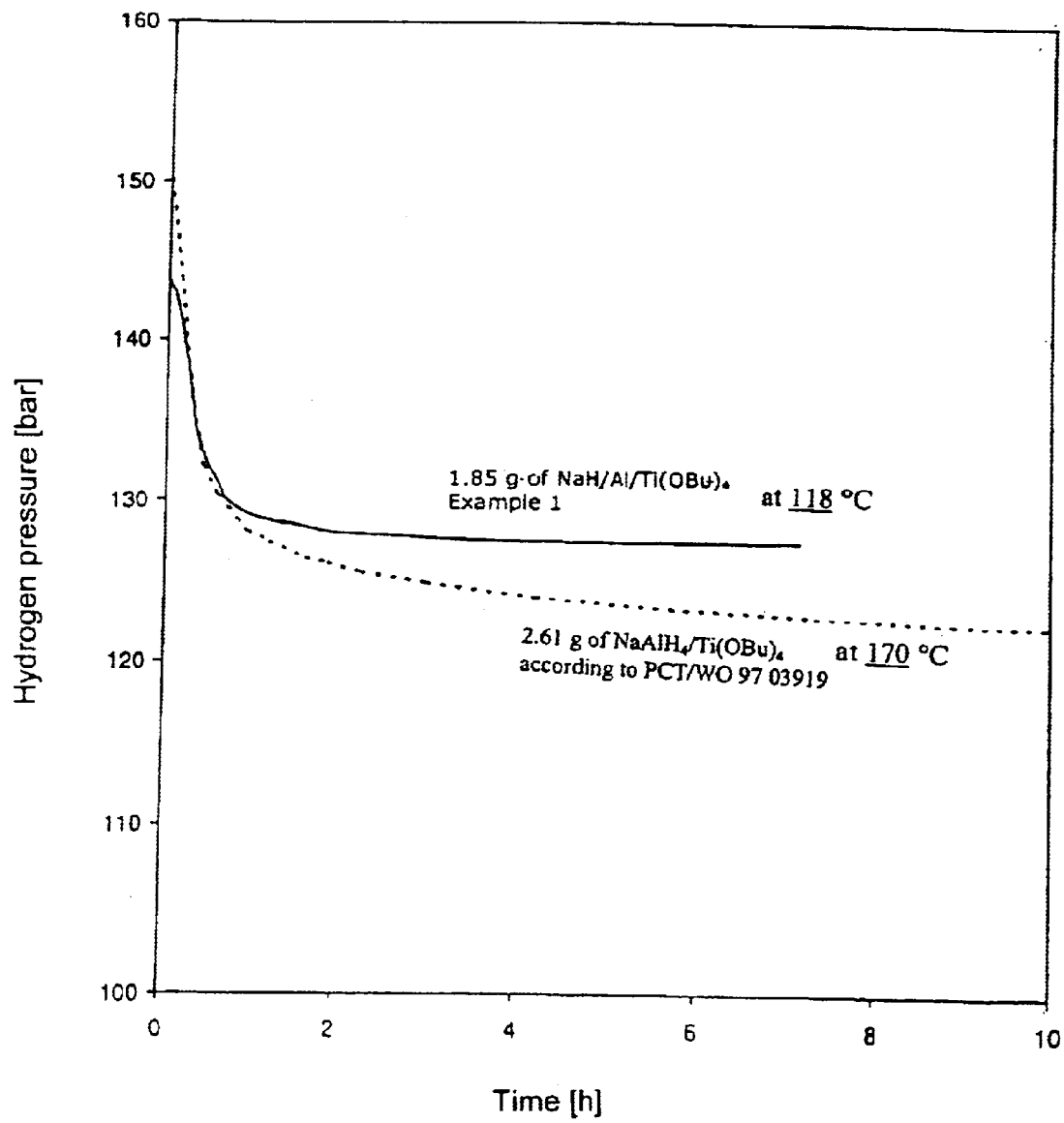

FIG. 2 shows the course of hydrogenation of a hydrogenation cycle according to the previous method at 170° C. and according to the present method at 118° C. and illustrates the significantly increased activity.

Figure 3:
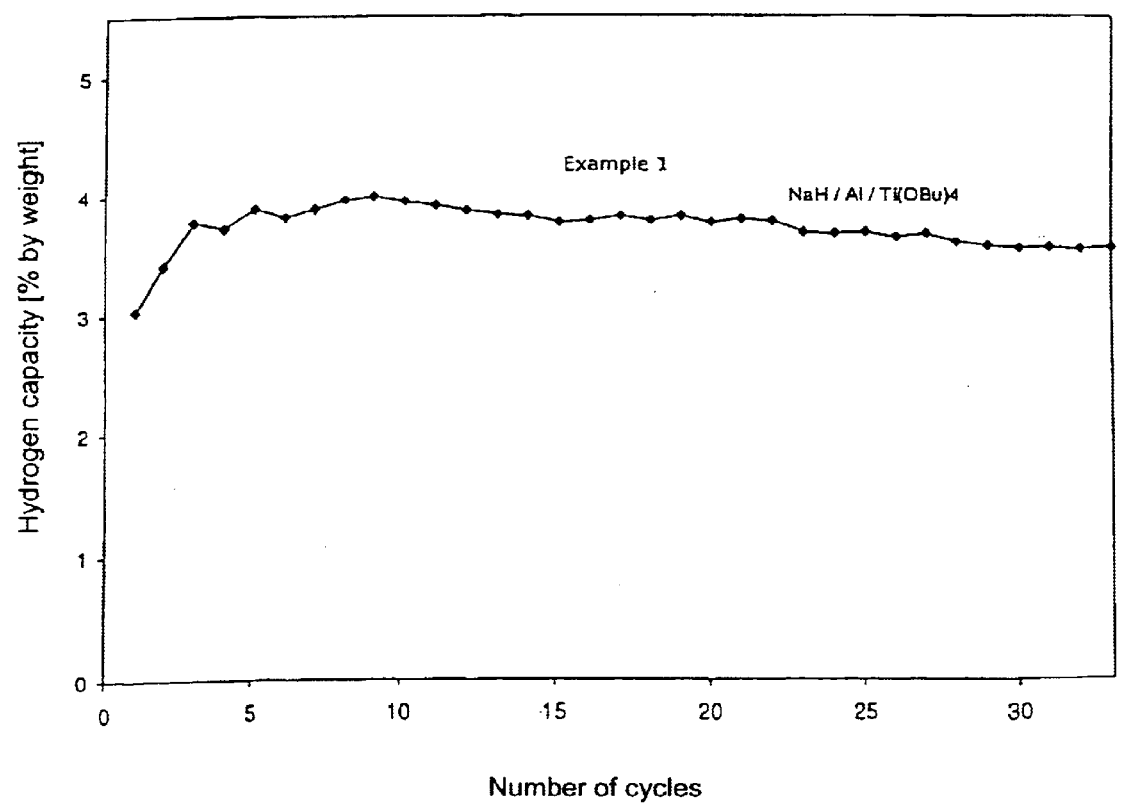

In FIG. 3, 33 hydrogenation/dehydrogenation cycles of a material obtained according to the present method are recorded, demonstrating the reversible character of the new materials.

A typical storage material preparation according to the present invention consists in intensely stirring aluminum powder, untreated or after brief heating under vacuum to about 200° C., with finely powdered sodium hydride under a protective gas (e.g., argon). Subsequently, catalytic amounts of titanium tetra-n-butylate (from 0.1 to 10 mole percent, based on aluminum, preferably from 1 to 5 mole percent) are added dropwise with stirring (or optionally under milling). In this way, a gray and slightly tacky, but still pourable powdery mixture is obtained, which is then charged into an autoclave. At first, hydrogenation is performed under pressures of between 5 and 150 bar and temperatures of between 20 and 200° C. Subsequently, dehydrogenation is performed against elevated pressure or normal pressure at temperatures of between 50 and 250° C., thus periodically cycling in a suitable pressure installation (Example 1).

In order to achieve as good as possible hydrogenation kinetics and high storage capacities, the aluminum is preferably employed in the form of fine grindings (see Examples 1 and 5: the surface areas according to BET measurement are 12.2 and 2.0 $m^2/g$, respectively).

In a modification of the storage material preparation described, the aluminum employed may optionally be pre-activated by milling, ultrasonication or chemical activation. Instead of sodium hydride or sodium, other alkali metal hydrides or alkali metals (especially Li and K) may also be used singly or in combinations. The molar ratio between aluminum and alkali metal can be varied between 1:0.3 and 1:5. If aluminum and Na or NaH are employed at a molar ratio of about 1:1 or about 1:3, $NaAlH_4$ or $Na_3AlH_6$, respectively, are obtained in the hydrogenation. Optionally, the alkali metals of their hydrides may be pretreated by milling or ultrasonication prior to being used. As catalysts, transition metals or transition metal compounds or alloys of Periodic Table groups 3 to 11 and of the rare-earth metals which may be bonded to elements of groups 14 to 17 or to hydrogen are used singly or in combinations. The transition metal or rare-earth metal compounds are preferably employed in the form of halides, hydrides, alcoholates, amides or organometallic compounds. Particularly preferred are halides, alcoholates and organometallic compounds of titanium, zirconium and the rare-earth metals.

The advances of the present method over the previous SGK method (PCT/WO 97/03919) reside in the following improvements:

the educts are readily available commercially;

lower process costs;

significantly facilitated preparation of the storage material;

no organic solvents are used;

significantly improved hydrogenation and dehydrogenation kinetics.

The invention is further illustrated by the following Examples without being limited thereto. All experiments were performed in a protective gas atmosphere, e.g., argon.

EXAMPLE 1

Mixture of Al and NaH Powders Doped with Titanium Tetra-n-butylate as Reversible Hydrogen Storage Material; 33 Cycle Test The aluminum employed was Al grindings (Lunasol) supplied by the Frankfurter Bronzefarben-und Blattmetall-fabrik Julius Schopflocher AG and having a surface area of 12.2 m$^2$/g (according to BET measurement).

The NaH was finely powdered in a glass bead mill. The aluminum powder was briefly heated to 200° C. at 0.1 mbar (aluminum content according to an elemental analysis performed by the company H. Kolbe of Mülheim a.d. Ruhr: 91.7% by weight).

Under argon, 753 mg (31.4 mmol) of the powderized sodium hydride was intensely mixed with 980 mg (33.3 mmol) of the vacuum-heated aluminum grindings by stirring with a magnetic stirring bar. Then, 0.21 ml (0.62 mmol=1.9 mole percent, based on Al) of titanium tetra-n-butylate was slowly added to the stirred powder from a fine dropping syringe, and stirring was continued for a short time. 1850 mg of the gray and slightly tacky, but still pourable powdery material obtained was charged into an autoclave (volume about 40 ml) with a glass lining. The autoclave was equipped with an interior temperature sensor, electric heating with a ramping function, electric pressure transducer and a multi-channel recorder. In order to test the suitability of the material as a reversible hydrogen storage material, it was subjected to a series of 33 hydrogenation/dehydrogenation cycles (cycle test) (see Table 1). The cycle test was performed in a so-called open system, i.e., for each hydrogenation, fresh hydrogen (99.9%) was taken from a hydrogen pressure tank, and for each dehydrogenation, hydrogen was desorbed against normal pressure.

TABLE 1

Cycle test (Example 1)

| # of cycles | Temp. [° C.] | Final pressure[a] [bar] | Time [h] | % by weight of H$_2$ |
|---|---|---|---|---|
| 1 | 165 | 133 | 24 | 3.03 |
| 2 | 135 | 135 | 8.7 | 3.41 |
| 3 | 135 | 137 | 13 | 3.77 |
| 4 | 103 | 89 | 20 | 3.72 |
| 5 | 135 | 125 | 9.8 | 3.88 |

TABLE 1-continued

Cycle test (Example 1)

| # of cycles | Temp. [° C.] | Final pressure[a] [bar] | Time [h] | % by weight of H$_2$ |
|---|---|---|---|---|
| 6 | 116 | 103 | 4.6 | 3.81 |
| 7 | 118 | 127[b] | 7 | 3.88 |
| 8 | 120 | 127 | 7.3 | 3.96[c] |
| 9 | 120 | 126 | 7.5 | 3.99 |
| 10 | 120 | 121 | 4.5 | 3.95 |
| 11 | 120 | 128 | 4 | 3.91 |
| 12 | 120 | 129 | 4 | 3.87 |
| 13 | 120 | 125 | 4.3 | 3.83 |
| 14 | 120 | 132 | 4.6 | 3.82 |
| 15 | 120 | 130 | 3.8 | 3.76 |
| 16 | 120 | 128 | 9.4 | 3.78 |
| 17 | 120 | 131 | 4.5 | 3.81 |
| 18 | 120 | 132 | 4.5 | 3.78 |
| 19 | 120 | 129 | 4.6 | 3.81 |
| 20 | 120 | 130 | 5 | 3.76 |
| 21 | 120 | 132 | 5 | 3.79 |
| 22 | 120 | 128 | 5.5 | 3.77 |
| 23 | 120 | 130 | 5.5 | 3.68 |
| 24 | 120 | 127 | 6.5 | 3.67 |
| 25 | 120 | 129 | 5.3 | 3.68 |
| 26 | 120 | 132 | 5.7 | 3.64 |
| 27 | 120 | 131 | 11.5 | 3.67 |
| 28 | 120 | 108 | 7.5 | 3.60 |
| 29 | 120 | 134 | 5.3 | 3.57 |
| 30 | 120 | 96 | 7.5 | 3.55 |
| 31 | 120 | 132 | 5.5 | 3.56 |
| 32 | 120 | 133 | 5.5 | 3.54 |
| 33 | 120 | 123 | 5.8 | 3.56 |

[a]For establishing the initial pressure, about 4 bar per percent by weight of H$_2$ must be added to the final pressure.
[b]See FIG. 2
[c]See FIG. 1.

Hydrogenation: The hydrogenations were performed at temperatures of between 103 and 165° C., mostly as about 120° C., under a decreasing hydrogen pressure in an autoclave (see FIG. 2, 7th cycle).

Dehydrogenation: The sample was quickly heated from room temperature to 160° C. and kept constant at this temperature until the end of hydrogen evolution. The time course of hydrogen evolution was recorded with the aid of an automatic gas burette (Chem. Ing. Tech. 55 (1983) p. 156) together with the interior temperature of the sample. FIG. 1 shows the course of dehydrogenation (8th cycle, 3.96% by weight of H$_2$) as compared to the prior art.

The dependence of the hydrogen storage capacity (measured by the amount of H$_2$ released during dehydrogenation) on the number of cycles is shown in FIG. 3.

After a total of 34 hydrogenation cycles, the storage material in the hydrogenated form was removed from the autoclave and examined by infrared spectroscopy. The IR spectrum shows AlH$_4$ and AlH$_6$ bands in addition to weak CH and C—O bands (alcoholate groups).

EXAMPLE 2

Mixture of Al and NaH Powders Doped with Titanium Tetra-n-butylate as Reversible Hydrogen Storage Material Using Untreated Aluminum Grindings The preparation of storage material was effected by analogy with Example 1, but employing untreated commercial aluminum rather than the product heated under vacuum. The material was examined in 7 cycles and reached a storage capacity of 3.7% by weight of H$_2$ in the 3rd hydrogenation cycle and 3.6% by weight of H$_2$ in the 7th hydrogenation step.

EXAMPLE 3

Mixture of Al and NaH Powders Doped with β-TiCl$_3$ as Reversible Hydrogen Storage Material The preparation of storage material was effected by analogy with Example 1, except that the aluminum grindings were not heated under vacuum, but milled mechanically in a glass bead mill prior to use. Instead of Ti(OBu)$_4$, 2 mole percent of β-TiCl$_3$ was used for doping. The material was cycled and reached a capacity of 2.5% by weight of H$_2$ in the 1st hydrogenation and 2.9% by weight of H$_2$ in the 5th hydrogenation step (at 135° C./about 140 bar).

EXAMPLE 4

Mixture of Al and NaH Powders [Molar Ratio= 1:2.9] Doped with Titanium Tetra-n-butylate for the Preparation of Na$_3$AlH$_6$ as Reversible Hydrogen Storage Material The preparation of storage material was effected by analogy with Example 1, except that the aluminum grindings were not heated under vacuum, but milled mechanically in a glass bead mill prior to use. The molar ratio between aluminum and sodium hydride was 1:2.9. The material reached a capacity of 2.2% by weight of H$_2$ in the 1st hydrogenation and 1.5% by weight of H$_2$ in the 5th hydrogenation step (at 117° C./35 bar).

EXAMPLE 5

Mixture of Al and NaH Powders Doped with Titanium Tetra-n-butylate as Reversible Hydrogen Storage Material Using Spherical Al Powder of about 20 μm The preparation of storage material was effected by analogy with Example 2, but employing spherical Al powder (about 20 μm) supplied by Aldrich (surface area of 2.0 m$^2$/g according to BET measurement) in untreated form instead of the Al grindings. The material reached a capacity of 0.9% by weight of H$_2$ in the 1st hydrogenation (165° C./150 bar) and 1.5% by weight of H$_2$ in the 2nd hydrogenation step (165 to 182° C./150 bar).

What is claimed is:

1. A method for reversibly storing hydrogen, catalysts said method comprising
    a) hydrogenerating a mixture of aluminum metal with alkali metals and/or alkali metal hydrides and transition metal and/or rare-earth metal catalysts to yield a product comprising a complex alkali metal aluminum hydride;
    b) dehydrogenating the product obtained in step a) to yield hydrogen gas and at least one other product;
    c) hydrogenating said other product to yield said complex alkali metal aluminum hydride according to step a); and
    d) repeating steps b) and c);
said method being conducted in the absence of organic solvents.

2. The method according to claim 1, wherein Li, Na and/or K metals are used as said alkali metals.

3. The method according to claim 1, wherein LiH, NaH and/or KH are used as said alkali metal hydrides.

4. The method according to claim 3, wherein NaH is employed as said alkali metal hydride.

5. The method according to claim 1, wherein the molar ratio between the aluminum metal and the alkali metal or alkali metal hydride is from 1:0.3 to 1:5.

6. The method according to claim 5, wherein the aluminum metal and the alkali metal or alkali metal hydride are employed at a molar ratio of about 1:1 to from MAlH$_4$ (M=Li, Na and/or K).

7. The method according to claim 5, wherein the aluminum metal and the alkali metal or alkali metal hydride are employed at a molar ratio of about 1:3 to form M$_3$AlH$_6$ (M=Li, Na and/or K).

8. The method according to claim 1, wherein said alkali and alkaline earth metals or their hydrides are employed as finely divided powders.

9. The method according to claim 8, wherein said alkali metals or their hydrides are pretreated by milling or ultrasonication prior to use.

10. The method according to claim 1, wherein the aluminum metal is employed as a finely divided powder.

11. The method according to claim 10, wherein said aluminum metal is optionally pretreated by heating under vacuum, ultrasonication, milling or chemical activation prior to use.

12. The method according to claim 10, wherein the finely divided powder is aluminum grindings.

13. The method according to claim 1, wherein the catalysts are transition metals and/or transition metal compounds or alloys of Periodic Table groups 3 to 11 and of the rare-earth metals.

14. The method according to claim 13, wherein the metals of said transition metal or rare-earth metal catalysts are bonded to elements of Periodic Table groups 14 to 17 or hydrogen.

15. The method according to claim 14, wherein said transition metal or rare-earth metal catalyst are employed in the form of halides, hydrides, alcoholates, amides, organometallic compounds and/or intermetallic compounds or their hydrides.

16. The method according to claim 15, wherein titanium and zirconium are employed as said transition metals.

17. The method according to claim 13, wherein said transition metals or their compounds are employed in amounts of from 0.1 to 10 mole percent, based on aluminum.

18. The method according to claim 17, wherein said transition metals or their compounds are employed in amounts of from 1 to 5 mole percent, based on aluminum.

19. The method according to claim 1, wherein all components of the mixture are mechanically mixed, stirred milled together to a first hydrogenation.

20. The method according to claim 1, wherein said hydrogenations are performed at pressures of between 5 and 150 bar and at temperatures of between 20 and 200° C.

21. The method according to claim 1, wherein said dehydrogenations are performed at temperatures of between 50 and 250° C.

22. A process for preparing a hydrogen storage material comprising one or more alkali metal alanates doped with one or more transition metal or rare-earth metal catalysts said process comprising reacting a mixture of aluminum metal with an alkali metal or alkali metal hydride in the presence of said one or more catalysts and in the absence of an organic solvent.

* * * * *

UNITED STATES PATENT AND TRADEMARK OFFICE
CERTIFICATE OF CORRECTION

| | | |
|---|---|---|
| PATENT NO. | : 6,814,782 B2 | Page 1 of 1 |
| APPLICATION NO. | : 10/221466 | |
| DATED | : November 9, 2004 | |
| INVENTOR(S) | : Bogdanovic et al. | |

It is certified that error appears in the above-identified patent and that said Letters Patent is hereby corrected as shown below:

On The Title Page, Item (12), "Bogdanovićet al." should read -- Bogdanović et al. --

Column 5, Line 44, "storing hydrogen, catalysis said" should read -- storing hydrogen catalysts, said --

Column 6, Line 34, "metal catalyst" should read -- metal catalysts --

Column 6, Line 56, "catalysts said" should read -- catalysts, said --

Signed and Sealed this

Twenty-ninth Day of May, 2007

JON W. DUDAS
*Director of the United States Patent and Trademark Office*